(12) United States Patent
Benedetto

(10) Patent No.: US 11,819,764 B2
(45) Date of Patent: Nov. 21, 2023

(54) IN-GAME RESOURCE SURFACING PLATFORM

(71) Applicant: Sony Interactive Entertainment LLC, San Mateo, CA (US)

(72) Inventor: Warren Benedetto, Foothill Ranch, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 158 days.

(21) Appl. No.: 16/044,476

(22) Filed: Jul. 24, 2018

(65) Prior Publication Data
US 2020/0030702 A1    Jan. 30, 2020

(51) Int. Cl.
| A63F 13/67   | (2014.01) |
| A63F 13/5375 | (2014.01) |
| A63F 13/65   | (2014.01) |
| A63F 13/79   | (2014.01) |
| A63F 13/847  | (2014.01) |
| A63F 13/85   | (2014.01) |
| A63F 13/35   | (2014.01) |

(52) U.S. Cl.
CPC .......... *A63F 13/67* (2014.09); *A63F 13/5375* (2014.09); *A63F 13/65* (2014.09); *A63F 13/79* (2014.09)

(58) Field of Classification Search
None
See application file for complete search history.

(56) References Cited

U.S. PATENT DOCUMENTS

| 9,533,215  | B1  | 1/2017 | Wakeford et al. ...... A63F 13/00 |
| 9,669,295  | B1  | 6/2017 | Harrington et al. ..... A63F 13/12 |
| 9,981,189  | B1  | 5/2018 | Wakeford et al. ...... A63F 13/60 |
| 10,232,269 | B1  | 3/2019 | Harrington et al. .... A63F 13/65 |
| 2010/0121808 | A1* | 5/2010 | Kuhn .................. G07F 17/3276 706/50 |
| 2014/0080556 | A1 | 3/2014 | Knutsson .......................... 463/7 |
| 2014/0080558 | A1 | 3/2014 | Knutsson ........................ 463/10 |

(Continued)

FOREIGN PATENT DOCUMENTS

KR    20180075931 A    7/2018

OTHER PUBLICATIONS

PCT/US2019/042697 International SearchIReport, PCT/ISA/210, European Patent Office, NL, dated Dec. 19, 2019.

(Continued)

*Primary Examiner* — Robert T Clarke, Jr.
(74) *Attorney, Agent, or Firm* — PENILLA IP, APC

(57) ABSTRACT

Technology is described for surfacing contextually related resources to a player of a video game by way of a surfacing platform. In a method embodiment, an operation processes a query from a player of a video game that is related to completing an objective. The method includes operations for processing game data of the player for determining a current state and processing game data of other players that have completed the objective. The method further includes operations for identifying successful attempts of completing the objective by other players and the resources used in doing so. The method selects a resource that is usable by the player to complete the objective based on those resources by the other players in the successful attempts and presents the resource to the player for immediate use.

18 Claims, 14 Drawing Sheets

(56) References Cited

U.S. PATENT DOCUMENTS

| | | | |
|---|---|---|---|
| 2014/0080559 A1 | 3/2014 | Knutsson et al. | 463/10 |
| 2014/0080560 A1 | 3/2014 | Knutsson | 463/10 |
| 2014/0080561 A1 | 3/2014 | Knutsson | 463/10 |
| 2014/0080600 A1 | 3/2014 | Knutsson et al. | 463/31 |
| 2014/0080601 A1 | 3/2014 | Knutsson | 463/31 |
| 2014/0081438 A1 | 3/2014 | Knutsson | 700/92 |
| 2014/0106876 A1 | 4/2014 | Knutsson et al. | 463/31 |
| 2014/0106877 A1 | 4/2014 | Knutsson et al. | 463/31 |
| 2014/0106878 A1 | 4/2014 | Knutsson | 463/31 |
| 2014/0113704 A1 | 4/2014 | Knutsson | 463/23 |
| 2014/0128159 A1 | 5/2014 | Knutsson | 463/31 |
| 2014/0135102 A1 | 5/2014 | Knutsson | 463/23 |
| 2014/0135104 A1 | 5/2014 | Knutsson | 463/24 |
| 2014/0135120 A1 | 5/2014 | Knutsson et al. | 463/31 |
| 2016/0279521 A1 | 9/2016 | Knutsson et al. | A63F 13/63 |
| 2016/0287992 A1 | 10/2016 | Knutsson et al. | A63F 13/46 |
| 2016/0303475 A1 | 10/2016 | Norden | A63F 13/25 |
| 2017/0007920 A1 | 1/2017 | Knutsson | A63F 13/2145 |
| 2017/0173471 A1 | 6/2017 | Knutsson et al. | A63F 13/537 |
| 2017/0282063 A1* | 10/2017 | Krishnamurthy | A63F 13/5375 |
| 2018/0104592 A1 | 4/2018 | Knutsson et al. | A63F 13/537 |
| 2018/0221761 A1 | 8/2018 | Knutsson et al. | A63F 13/25 |
| 2018/0243654 A1 | 8/2018 | Wakeford et al. | A63F 13/60 |
| 2019/0209924 A1 | 7/2019 | Harrington et al. | A63F 13/65 |

OTHER PUBLICATIONS

JP2021-503778, Notification of Reasons for Refusal, Eng. translation, ref. PW210001, Dispatch No. 857429, dated Dec. 21, 2021.

* cited by examiner

PlayStation Store  | Games  | Movies  | TV Shows

Just for You:  PS VR >  PS4 >  PS Vita/PS TV/PSP >  Discover >  Play >  Expand >  $ave >

Recommended Just For You Based on Your Play History

Chest Armor for Game 1
Players using this armor reduced damage taken by an average of 100 points while battling Boss X
$1.50

Guardian Shield for Game 1
Players using this shield are 50% more likely to defeat Boss X
$1.99

Potion for Game 2
You are 50% more likely to complete stage 2
$0.50

Launch Pad for Game 3
Players who use this item are 25% more likely to level up to level 42
$2.50

FIG. 11

IN-GAME RESOURCE SURFACING PLATFORM

FIELD OF THE DISCLOSURE

The present disclosure relates generally to video games, and more particularly, to methods and systems for surfacing contextually relevant in-game resources to players that are in need of help during gameplay.

BACKGROUND

Many video-games have hundreds to thousands of individual items for users to earn, find, or purchase, and use within the video game. Some of these include tools, armor, skins, vehicles, consumables, etc. There are also hundreds to thousands of individual game titles available to players on many popular platforms such as PlayStation®, personal computers (PC), and mobile devices. This results in a selection of items that is far more vast for players of present than that for players of just a few product cycles ago. While both the range of in-game items as well as the number of game titles has steadily increased over the years, the methodology players use to find suitable or effective items for making progress within a game has not kept pace.

For example, a player generally must rely on a combination of trial and error, guesswork, and research such as by asking a friend when deciding on which item, add-on, or upgrade to obtain in order to achieve a goal. Even then, the player may have to experiment with a number of items, add-ons, and/or upgrades, before arriving at one that is most effective for their particular objective, character, style of play, etc. Thus, there is currently a disconnect between players and the resources available to them within a game, and more particularly those resources most suitable for the individual player's circumstances, character, and playstyle. When players become frustrated with their repeated failures to accomplish some objective, there is a higher likelihood that the player will quit the game and not experience the totality of what the game is intended to offer. There is thus a need and a benefit to develop and integrate an in-game platform to match players with those resources that are most likely to help them succeed in view of the player's playstyle and behavior both within the game in question as well as across a plurality of additional games the player participates in. There is moreover, a need and benefit for game publishers and virtual store platforms to be able to identify specific in-game resources that would complement the player in their gameplay and communicate the same to them.

It is in this context that embodiments arise.

SUMMARY

Embodiments of the present disclosure relate to methods and systems for searching and identifying in-game resources that assist a player based on contextual data and data from a community of similar players.

In one embodiment, a computer-implemented method is provided. The method provides an operation for processing a query from a device of a player of a video game, where the query is related to completing an objective by advancing to a subsequent state from a current state in the video game. The method provides an operation for processing game data of the player for determining the current state of the player within the video game and processing game data of other players that have completed the objective by advancing to the subsequent state from the current state. The method also provides an operation for identifying, from the game data of other players, successful attempts of completing the objective and identifying one or more resources utilized by respective other players during said successful attempts of completing the objective. Moreover, the method provides an operation for selecting a resource that is usable by the player to complete the objective based on the one or more resources utilized by respective other players during said successful attempt of completing the objective and an operation for presenting the resource to the player via the device for immediate use by the player in response to a selection of the resource by the player.

In another embodiment, a computer-implemented method includes an operation for receiving a request to access a virtual store that enables the player to select resources for use while playing a plurality of video games. The method also provides for determining, at the server, an objective that the player is to have through continued play of the video game based on the current state of the player and based on the game data of other players that have made more progress in the video game. The method further provides for an operation that identifies, from the game data of other players, successful attempts of completing the objective and identifying one or more resources utilized by respective other players during said successful attempts of completing the objective, where the objective involves advancing from the current to a subsequent state. Moreover, the method provides for selecting a resource that is usable by the player to complete the objective from the one or more resources utilized by respective other players during said successful attempts of completing the objective and for presenting the resource to the player via an interface for the virtual store.

In yet another embodiment, a non-transitory computer-readable storage medium storing a computer program executable by a processor based system is provided. The non-transitory computer-readable storage medium includes program instructions for processing a query from a device of a player of a video game, the query being related to completing an objective by advancing to a subsequent state from a current state in the video game. The non-transitory computer-readable storage medium also includes program instructions for processing game data of the player for determining the current state of the player within the video game and processing game data of other players that have completed the objective by advancing to the subsequent state from the current state. The non-transitory computer-readable storage medium additionally provides for program instructions for identifying, from the game data of other players, successful attempts of completing the objective and identifying one or more resources utilized by respective other players during said successful attempts of completing the objective. Moreover, the non-transitory computer-readable storage medium provides program instructions for selecting a resource that is usable by the player to complete the objective based on the one or more resources utilized by the respective other players during said successful attempts and program instructions for presenting the resource to the player via the device for immediate use by the player in response to a selection of the resource by the player.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 11 shows a front-end view a virtual store having a surfacing platform, according to one embodiment

DETAILED DESCRIPTION

Embodiments of the present disclosure relate to methods and systems for searching and identifying in-game resources that assist a player based on contextual data and data from a community of similar players. It will be obvious, however, to one skilled in the art, that the present disclosure may be practiced without some or all of these specific details. In other instances, well known process operations have not been described in detail in order to not unnecessarily obscure the present disclosure.

Figure 1:
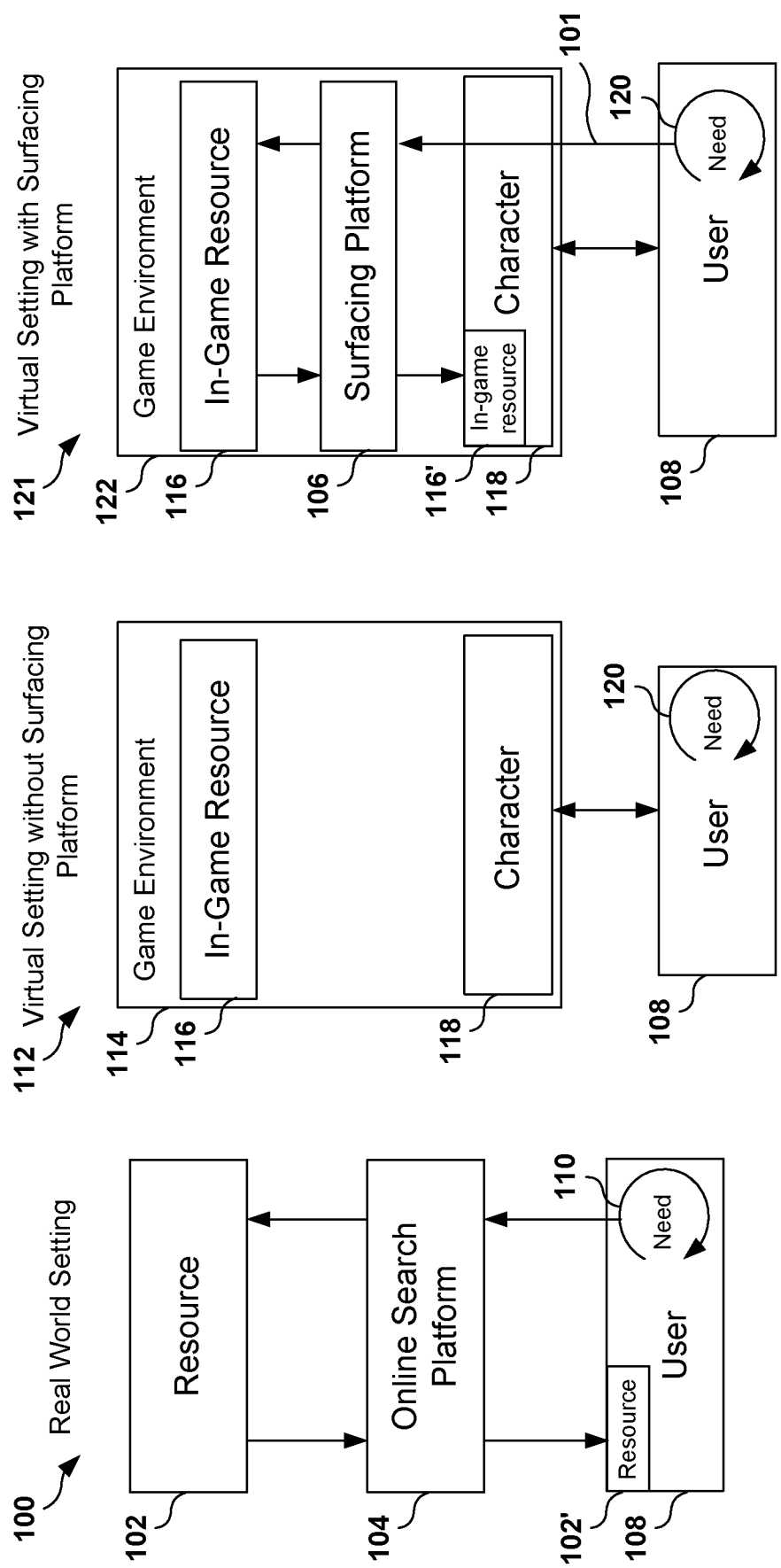
FIGS. 1A-1C show conceptual diagrams how resources are identified and delivered or not to a user, according to various embodiments.

FIGS. 1A-1C show conceptual diagrams how resources are identified and delivered or not to a user, according to various embodiments. FIG. 1A shows a user 108 with a need 110 that relates to a resource 102 within a real world setting 100. The need 110 may be for an answer to a question, an address, a name, an application, a video, an image, a body of text, a product, a service, or some other data. When the user 108 has such a need 110, they know what the need 110 comprises and how to communicate the same to, for example, an online search platform 104 such as Google, Bing, Duckduckgo, Yahoo!, Amazon.com, an application store, or some other program that searches a database. When the need 110 is communicated to the online search platform 104, it is in the form of a query. The online search platform 104 uses keywords or characters within the query to return a list of search results that matches the query and is is typically arranged by a relevance ranking. The online search platform 104 is thus able to deliver resource 102' into the possession of the user 108 and meet the need 110.

Often, the need 110 will pertain to a commerce opportunity, such as a product or service for sale, or some information that will result in a sale. As a result, businesses are incentivized to advertise with the online search platform 104 by paying a fee to have their results appear at prominent locations within the list of search results. In this manner, all three of the user 108, the online search platform 104, and the provider of the resource 102 are benefitted by the transaction. The user 108 goes into possession of a resource 102' (e.g., a product, service, an application, a song, a movie, a clip, or some other piece of data or physical good) in a way that meets the need 110 at or near the moment that the need 110 arises in the user 108. The provider of the resource 102 is benefitted by connecting and transacting with the user 108, e.g., by making a sale, or by increasing brand awareness, or creating touch points to funnel the user 108 into a future transaction. Meanwhile, the online search platform 104 benefits from revenue obtained from the resource 102 provider and the continued use of the online search platform 104 by the user 108.

FIG. 1B illustrates a similar view of a relational structure between the user 108 within a virtual setting 112 of a game environment 114 that is without a surfacing platform, according to one embodiment. The user 108 interacts with the game environment 114 via a character 118. When interacting with the game environment 114, the user 108 may encounter problems that they are not able to solve. For example, the user 108 may encounter an objective that they are not able to accomplish with their current skill level, inventory, or knowledge. The objective may include defeating an enemy such as a boss, completing a stage, completing a treasure hunt, completing puzzle, defeating a competitor, setting a record, etc. A need 120 for some resource thus arises in the user 108 pertaining to accomplishing the objective.

Often, there may be an in-game resource 116 of the game environment 114 that could aid the user 108 in accomplishing the objective with the character 118. The in-game resource 116 may be downloadable content (DLC), add-ons, upgrades, items, tips, strategy, communal data, etc. However, the user 108 is not necessarily aware that such a resource exists. It follows that the user 108 is likewise unware that the particular in-game resource 116 is, for example, one resource out of hundreds or thousands of resources that is most likely to help the user 108 accomplish the objective given the game state, inventory, skill level, play history, and play style of the user 108. In many circumstances the character 118 and the game environment 114 are passive entities that also do not have the data or logic to determine which of the hundreds or thousands of resources are most effective for the user 108. Under the virtual setting 112 without a surfacing platform, there is no discernable way for the user 108 to communicate their need 120 to the game environment 114. Likewise, the game environment 114 is unable to surface or identify the in-game resource 116 that is most effective for user 108 to accomplish the objective. The in-game resource 116 is therefore not delivered to character 118 and the need 120 for a resource is not met.

FIG. 1C is a conceptual illustration of the relational structure between a user 108 and a virtual setting 121 of a game environment 122 having a surfacing platform 106, according to one embodiment. Similar to that shown in FIG. 1B, a need 120 may arise in user 108 pertaining to accomplishing some objective. However, unlike the structure shown in FIG. 1B, the user 108 in FIG. 1C is able to communicate the need 120 to a surfacing platform 106 in the form of a query 101. The surfacing platform 106 is envisioned to interpret the query 101 using natural language processing by using key words and characters similar to the online search platform 104 of FIG. 1A. However, in addition to processing the language of the query 101 for interpreting the need 120 of the surfacing platform 106 it is contemplated to include logic to approximate the intention of the user 108 as it relates to need 120.

The surfacing platform 106 is contemplated to access game state data and saved data of the user 118 as well as communal data of other users to better approximate the intention of user 108 given, for example, the current game state of the character 118, the game states leading up to the current game state, the inventory of character 118, the play style and skill level of user 108. Thus, for example, the surfacing platform 106 is able to interpret query 101 within the context of the current game state of the user 108 as well as within a meta-context of the user 108 as a player having tendencies, habits, and preferences specific to the user 108.

Moreover, the surfacing platform 106 is contemplated to use the game state data, saved data, and communal data to search for in-game resource 116 that is would be most effective for user 108 in achieving the objective. For example, the surfacing platform 106 may search game data of a player community similar to user 108 for those resources used by a plurality of players in achieving the current objective and rank them by effectiveness. The surfacing platform 106 may therefore identify in-game resource 116 as the resource most likely to enable user 108 to accomplish the objective and present it to the user 108. If the user 108 selects the in-game resource 116, it may then be delivered by the game environment 112 for the character 118 to possess and use immediately. In this manner, the user 108 benefits from receiving the in-game resource 116' to accomplish the objective and the game developer or publisher benefits from conveying resources to the user 108 in a meaningful way.

Figure 2:
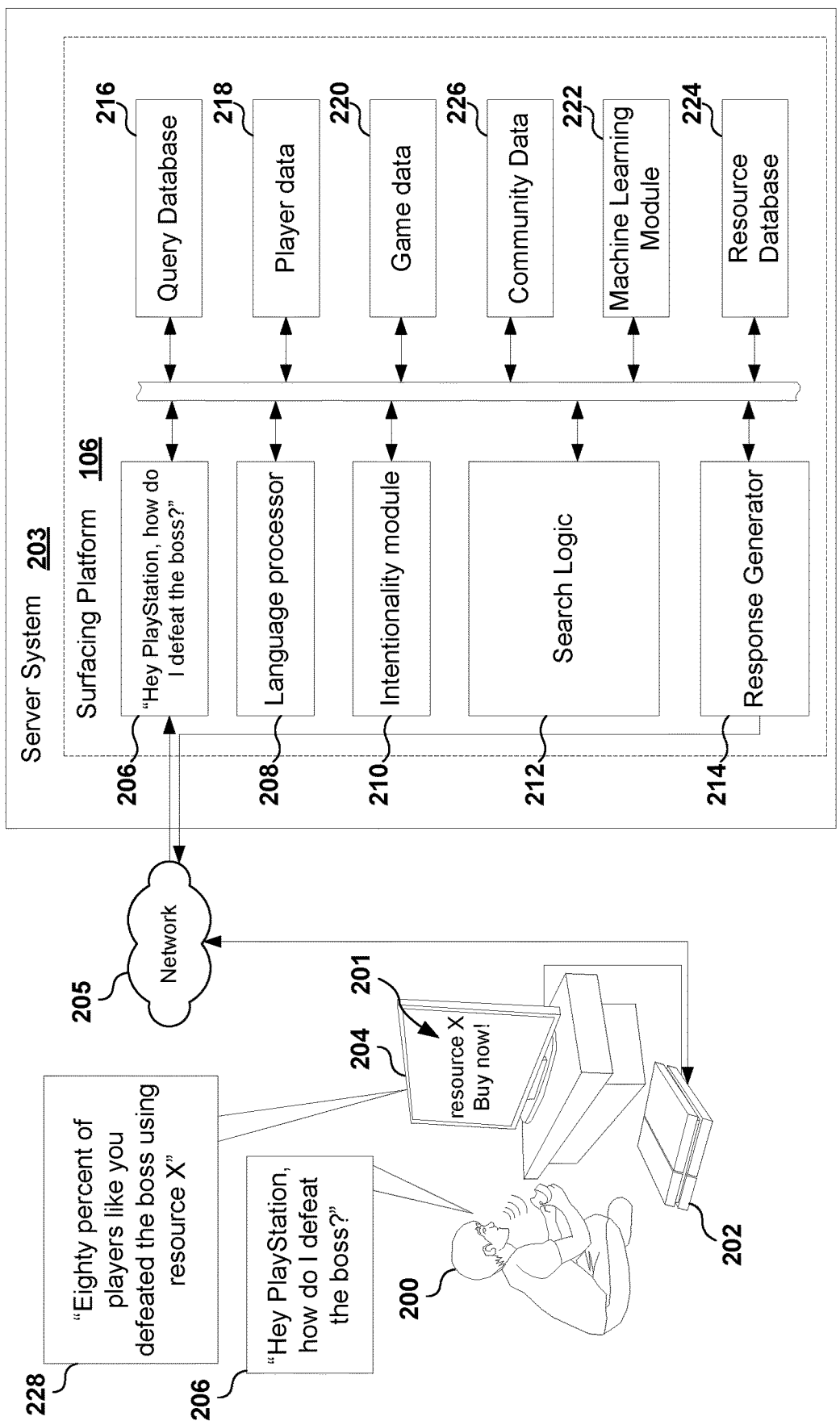
FIG. 2 is a conceptual diagram of a system for surfacing a contextually relevant resource in response to a query from a user, according to one embodiment.

FIG. 2 is a conceptual diagram of a server system 203 for executing a surfacing platform 106 for surfacing a contextually relevant resource 201 in response to a query 206 from a player 200, according to one embodiment. According to this embodiment, the player 200 is playing a game via a local gaming system 202 such as a PlayStation®, which executes the game and communicates a video component of the game to a display 204. The game system 202 communicates with the server system 203 via network 205. While the player 200 plays the game, they might encounter stages, challenges, enemies, puzzles, or other problems that they require assistance in completing. For example, player 200 may be attempting to defeat a boss character in the game after failing a number of times. While the player 200 may have access to a store in which to purchase various resources, they may not be aware of those resources most likely to assist them in defeating the boss character.

In this embodiment, the player 200 is able to submit a query 206 verbally to the game system 202 stating: "Hey PlayStation, how do I defeat the boss?" The query 206 is captured by one or more sound capture devices in the gaming environment such as by a handheld controller, a headset, the gaming system 202, or the display 204. The query 206 is communicated to the server system 203 via network 205. Although the embodiment of FIG. 2 shows a game system 202 that is local to the player 200, it is also contemplated that the server system 203 may also execute the game remotely and communicate audio and video components for the game via network 205.

According to the embodiment of FIG. 2, the query 206 is communicated to the surfacing platform 106 of server system 203, which enables a search of contextually relevant resources based on the query 206, game data 220, player data 218, and community data 226. The surfacing platform 106 of the server system 203 is shown to include a language processor 208 for segmenting, parsing, and interpreting the query 206 from natural language speech into a format that is usable by the surfacing platform 106 to approximate an intention of the player 200 and perform a search. In some embodiments, the language processor is contemplated to include speech recognition capabilities, natural language parsing, grammar logic, semantic logic, keyword identification and other components for enabling detection and interpretation of the query 206.

The language processor 208 is shown to communicate with an intentionality module 210, which uses the output of the language processor 208 in conjunction with data obtained from a query database 216, player data 218, game data 220, community data 226, and the machine learning module 222 to approximate the intention of player 200. In many instances the query 206 will relate to an intention to do some act or achieve some result in the game (e.g., complete an objective by advancing from a current state to a subsequent state). The surfacing platform 106 is therefore enabled to perform a function that goes beyond the function of a common search engine.

For example, common search engines typically perform keyword matching and relevancy rankings, but do not necessarily function to determine an intention of the inquirer. A query of "how do I level up?" in a common search engine will return results that have little to do with the context around why the inquirer submitted the query. The results of such a query, for example, includes a blog post related to self-up and "leveling-up" in real life, a mobile ordering application named "LevelUp," a dictionary definition of "level up," and a YouTube channel named "LevelUP."

In contract, the surfacing platform 106 is contemplated to determine an intention of the player 200 using not only the language of the query 206, but also the contextual data from player data 218, game data 220, community data 226, and that from machine learning module 222. The surfacing platform 106 is therefore able to interpret a query of "how do I level up" in (1) the context of the current state the player 200 is in using game data 220; (2) the context of player preferences, tendencies, play history, playstyle, and skill level using player data 218; (3) the context of the game and game segment as played by a community of players that have been a similar position as the player 200 using community data 226; (4) the context of a plurality of queries submitted by players in the same or similar position of the player 200 using query database 216; (5) the context of heuristic models that learn the areas in which players target their effort (e.g., areas of struggle) using machine learning module 222. Using the contextual data available to the intentionality module 210, the surfacing platform 106 may therefore determine, for example, that the intention of the player 200 is to defeat Boss X (e.g., based the query database 216 and game data 220) without using special abilities (e.g., based on player data 218) and while retaining at least half of their health (e.g., based on game data 220, community data 226, and the machine learning module 222) for the next stage and while also leveling up during the fight with Boss X (e.g., based on community data 226 and the machine learning module 222).

According to the embodiment of FIG. 2, the surfacing platform 106 includes search logic 212, a resource database 224, and a response generator 214. The search logic 212 communicates with the intentionality module 210 for performing a search of resource database 224 for a resource that matches the intention approximated by the intentionality module 210. Similar to the intentionality module 210, the search logic 212 is contemplated to use contextual data from player data 218, game data 222, community data 226, and the machine learning module 222 in its search algorithms to identify one or more resources for enabling player 200 to fulfill the intention of "to defeat Boss X without using special abilities and while retaining at least half of their health for the next stage and while also leveling up during the fight with Boss X." For example, the search logic 212 may use player data 218 to identify or filter for the types of resources that the player 200 prefers to use or has been successful in the past with, game data 220 to access a list of the inventory of the player 200, the community data 226 to determine which resources have been effective in defeating Boss X and which have not. Further the machine learning module 222 may provide statistical analysis of resource effectiveness based on data from other players as well as various simulations of the player 200 fighting Boss X using various resources. The search logic 212 may thus identify resource X 201 from the resource database 224. The response generator 214 communicates a response 226 that may be spoken to player 228 indicating that "Eighty percent of players like you defeated the boss using resource X." Additionally, the response generator 214 may generate a graphic that notifies the player 200 of an option to purchase resource X 201, for example, by clicking on the graphic displayed or voicing as much to the game system 202.

Figure 3:
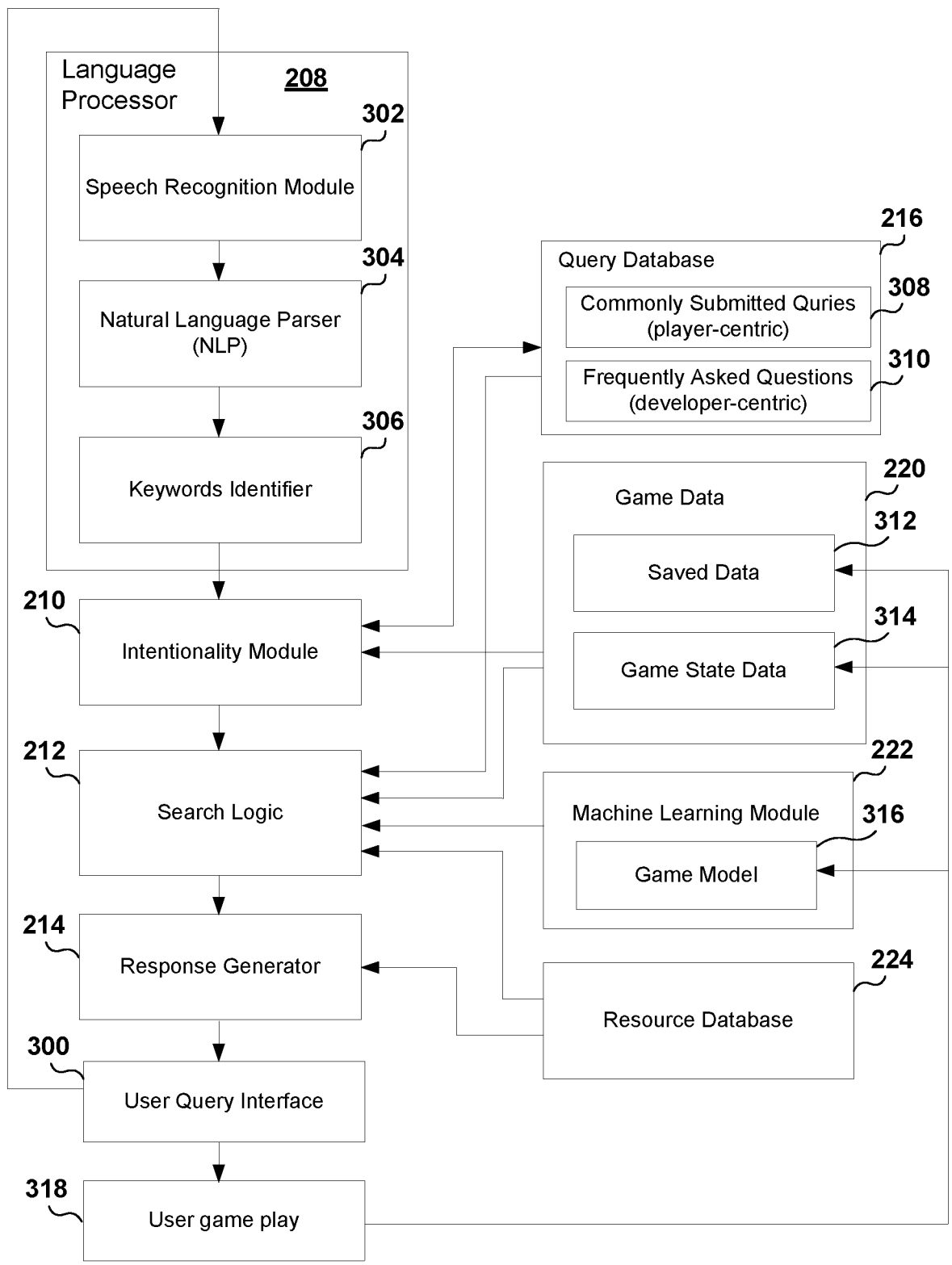
FIG. 3 shows a schematic diagram of certain components at the server for interpreting a query made by a user and generating a response to the query, according to one embodiment.

FIG. 3 shows a schematic diagram of certain components of an exemplary surfacing platform for interpreting a query made by a user and generating a response to the query, according to one embodiment. The user query interface 300 captures a query from a user and is enabled to distinguish queries from background noise and speech that do not contain queries. The user query interface 300 communicates the audio signals of the query to a speech recognition module 302, which translates the audio signals of the query into text. The text of the query is communicated to a natural language parser (NLP) 304, which provides syntactic and semantic analysis of the text of the query, including world isolation, morphological analysis, dictionary look-up, grammatical analysis, and language rule application, among other processes. The keywords identifier 306 further analyzes the query for terms that may be used to further categorize, index, cluster, or filter the query.

According to FIG. 3, the intentionality module 210 receives the query as processed by the language processor and approximates the intention behind the query. In some embodiments, the intentionality module 210 compares the query with a database of queries such as commonly submitted queries 308 and frequently asked questions 310. If there is a match between the query and one or more in the query database 216, the intentionality module 210 may use the corresponding intention as a data point in approximating the intention associated with the query.

As noted above, the intentionality module 210 accesses game data 220 to determine the set of possible intentions that are likely to be attributable to a player at the same or similar state within the game that the user is in. Game data 220 is shown to include saved data 312 and game state data 314. Saved data 312 includes information about the progress of the user in the game and is not generally time dependent. Saved data 312, for example, may include a list of inventory, a list of abilities, a level value, a character value, a stage value. Game state data 312 includes information that describes the user and other objects in relation to the game environment. Game state data 312 may be time dependent and include a time course of states as a function of time. Game state data 312 may include, for example, states of that the describe the users game play at various points in time, which may indicate the number of times the user attempted to achieve a certain objective, how close the user was to achieving that objective, the tactics the user employed to achieve the objective, etc. Together, the saved data 312 and the game state data 314 provide context to the intentionality module 210 for approximating the intention associated with the query. For example, the saved data 312 might indicate that the user possesses A, B, and C resources (e.g., qualities, level, item, weapon, ability, ally), and the game state data 314 indicates that the user has unsuccessfully attempted to achieve objective O2 five times in a row, the intentionality module 210 may use the aforementioned context to approximate that the user's intention is to acquire some resource or quality to achieve objective O2. Additionally, the intentionality module 210 may access a game file that maps, for example, the user's location within the game to a particular objective. Although not shown, the intentionality module 210 also has access to player data and community data for pulling additional contextual data for approximating that the intention is to achieve objective O2.

As noted above, the search logic 212 serves to identify one or more resources based upon contextual data analyzed from query database 216, game data 220, machine learning module 222, player data (not shown), and community data (not shown). The search logic 210 uses the intention as approximated by the intentionality module 210 as a constraint or end result for identifying the one or more resources. For example, if it is determined by the intentionality module 210 that achieving objective O2 is the intention behind the query, the search logic 212 is tasked with identifying those resources that are most likely to assist the user in to achieving objective O2 given the game data 220, player data, and community data. In some embodiments, the search logic 212 may examine the saved data 312 to determine the resources currently available to the user, e.g., resources A, B, and C. The search logic 212 will therefore filter for resources that are in addition to A, B, and C. Further, the search logic 212 may examine the game state data 314 to determine the particularities of the user's prior attempts to achieve objective O2. For example, game state data 314 may indicate that the user has unsuccessfully attempted to achieve objective O2 but successfully achieved prior objective O1 on the first attempt. In some embodiments, the search logic 212 analyzes the differences between objective O2 and objective O1 using the game model 316 to obtain contextual data as to the particulars of what is causing the user to struggle with objective O2 but not objective O1. For example, if it is found from the game model 316 that other players similar to the user with ranged weapons were more successful at achieving objective O1 but were less successful at achieving objective O2, the search logic may therefore narrow the search for resource X to non-ranged weapons.

It is contemplated that in some embodiments, the game model 316 is a statistical model of video game as played by a community of players with the saved data and game state data of a plurality of players as inputs. The game model 316 is built by the machine learning module 222 on individual player's saved data and game state data and is updated as players progress through the game. The machine learning module 222 may use heuristic models to track the progress of the plurality of players and learn how the players successfully and unsuccessfully achieve various objectives within the game as a function of various parameters. The game model 316 is further contemplated to use predictive analytics to extract information from existing game data to determine patterns for predicting likely future outcomes for other players. For example, the game model 316 may include statistical data related to how a plurality of other players in a similar situation as the user accomplished objective O2. The game model 316 may thus be probed by the search logic 212 for the likelihood that the user will succeed in at achieving objective O2 using resources D, E, and F, and others, given that the user achieved objective O1 on the first attempt, and given, for example, the player data. The game model 316 may, as a result, return that the probabilities of the user successfully achieving objective O2 is 20% with resource D, 80% with resource E, and 5% with resource F. The search logic 212 may, in turn, identify resource E from resource database 224 to present to the user via the user query interface 300.

In other embodiments, machine learning module 222 may run a plurality simulations using artificial intelligence (AI) that mimics the user's game play style with resources D, E, and F. For example, the machine learning module 222 may execute hundreds or thousands of simulations of the game segment encompassing the objective O2 for with the AI player provisioned with resource D, E, and F, respectively. Such simulations may be run in parallel and at an accelerated rate to reduce the time it takes to return the results to the search logic 212. For example, the machine learning module might execute 1,000 game simulations that would take over a minute to complete in real time within second or less using modern computational techniques. The aforementioned simulations may be executed in a short time frame because the graphical and audio components for the simulations need not be rendered. The search logic 212 may then identify one of resource D, E, or F that resulted in the greatest number of successful simulations to present to the user.

If the user selects, for example, resource E, it is envisioned that the user is to have immediate access to use resource E. As a result, there is little delay between the moment the user submits a query and the moment the user is able to use the result of the query (e.g., resource E). When the user uses resource E to attempt objective O2, the user game play 318 is tracked and inputted into the machine learning module 222 to update the game model 316.

Figure 4:
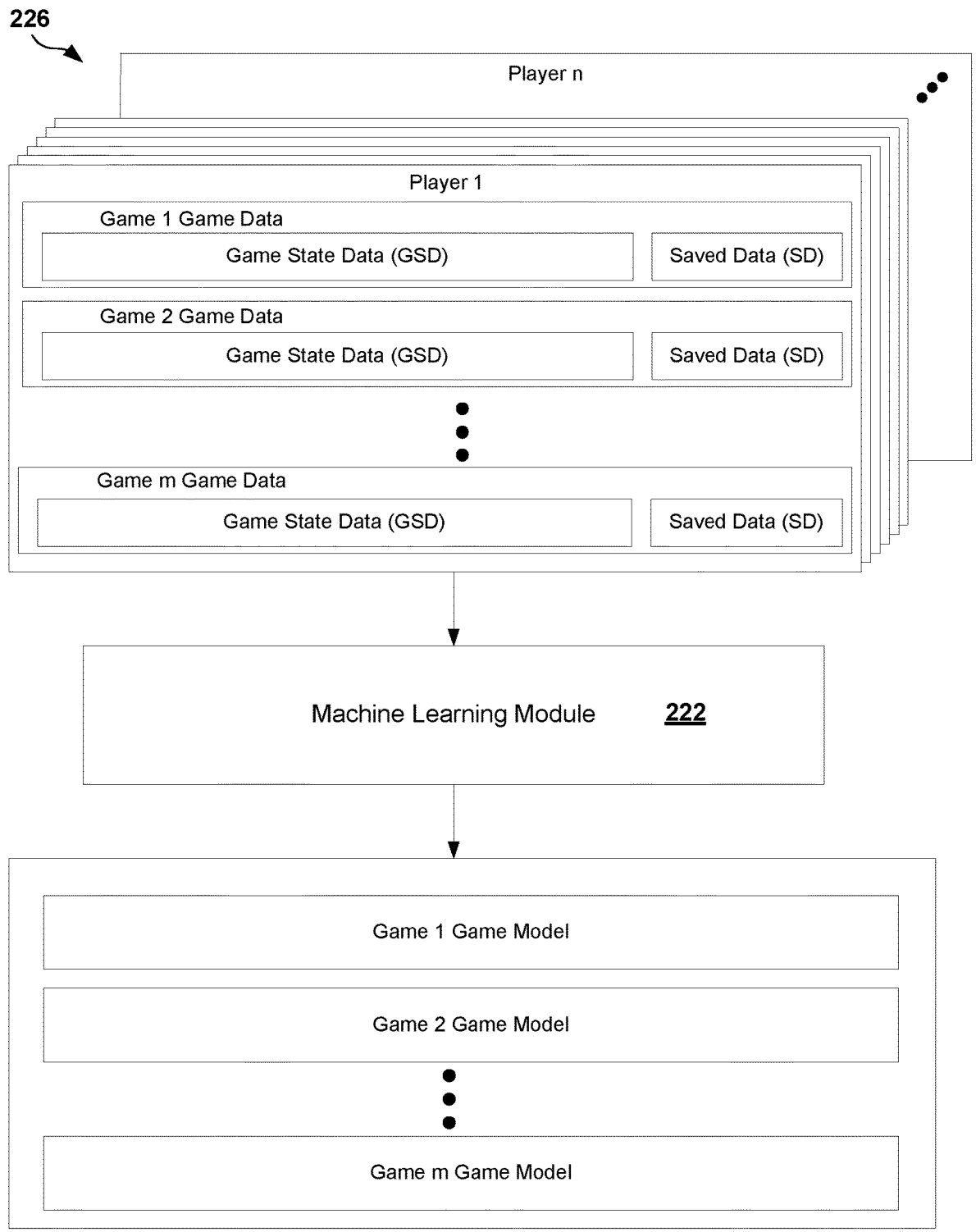
FIG. 4 shows a conceptual diagram of how game models are generated at the server for use by a surfacing platform, according to one embodiment.

FIG. 4 shows a conceptual diagram of how game models are generated at the server for use by a surfacing platform, according to one embodiment. Community data 226 includes game data for games 1 through m across players 1 through n, although not all players 1 through n have necessarily played each of games 1 through m. Player 1 is shown to have played game 1 through game m. Each of games 1 through m may represent an individual game title. As player 1 plays game 1 through game m, their game play is tracked in the form of game state data (GSD) and saved data (SD). The same is true of players 2 through n. The game data for players 1 through n are inputted into the machine learning module 222 to generate a game model for games 1 through m. As noted above, the game models describe how cohorts of players interact with a given game through their actions within the game and the subsequent results. For example, game 1 game model may include data related what various players did at a specific location and time within game 1 and what the result was. Predictive analytics may be applied to the data to determine patterns related to what players did and what result they produced to predict outcomes for future players that arrive at the specific location and time within game 1.

Figure 5:
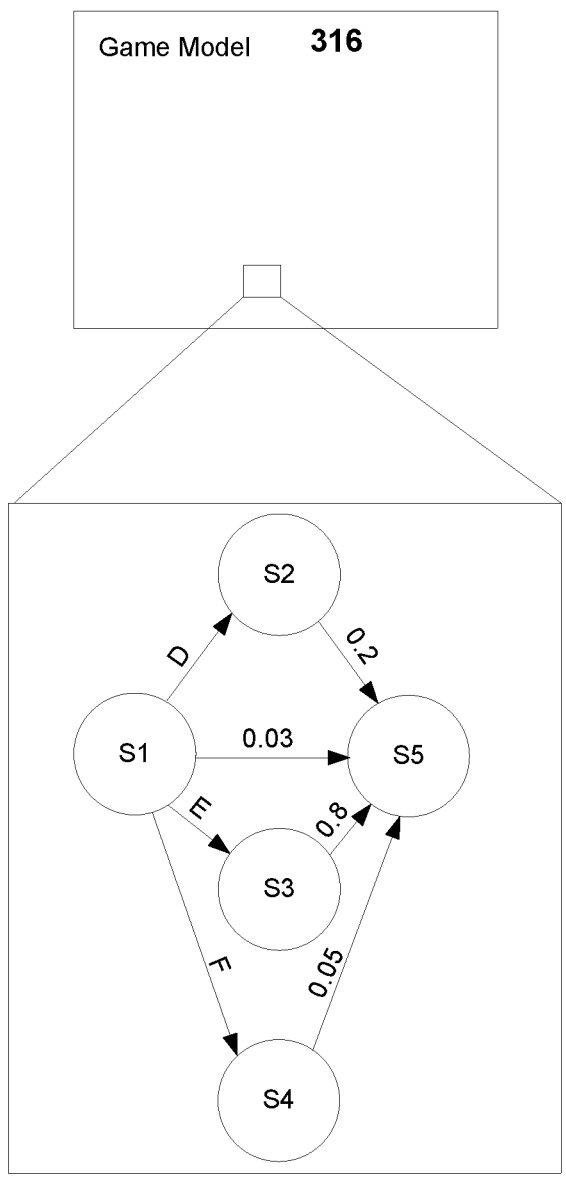
FIG. 5 shows a conceptual illustration of how a game model may be probed by a surfacing platform to identify a resource, according to one embodiment.

FIG. 5 shows a conceptual illustration of how a game model 316 may be probed by a surfacing platform to identify a resource, according to one embodiment. When the surfacing platform receives a query, it obtains contextual data related to the state the user is currently in by accessing the user's game state data and saved data. Using the game state data and saved data of the user, the surfacing platform is able identify the current state of the user and locate a corresponding state within the game model 316. Here, the current state of the user is assumed to correspond to state S1. The surfacing platform also has an approximation of the intention of the user via, for example, the intentionality module. The intention is to shown to be approximated to correspond to an objective of transitioning from state S1 to state S5. State S1 may represent a state within the game that is prior to defeating Boss X while state S5 may represent a state of having defeated Boss X. The edge between the nodes of state S1 and state S5 represents the probability the user is able to achieve the objective without obtaining some additional resource. Here, that probability is 3%. The probability of 3% may be determined from the game model based on a plurality of other users that were in state S1 with a similar skill level, play style, inventory, experience, etc. The probability may also be determined through simulations of an AI player modeled after the user attempting to reach state S5 from state S1 without some additional resource.

FIG. 5 also shows states S2, S3, and S4, which represent game states in which users obtained resource D, E, and F, respectively. The probabilities of users reaching state S5 from states S2, S3, and S4 are shown to be 20%, 80%, and 5%, respectively. Again, the aforementioned probabilities may be determined from the game model based upon how other users performed when attempting to reach state S5 while using resources D, E, and F, respectively, or they may be based on AI simulations. The game model thus enables the surfacing platform to identify one or more resources based on their likelihood or effectiveness in enabling the user to achieve the objective.

Figure 6:
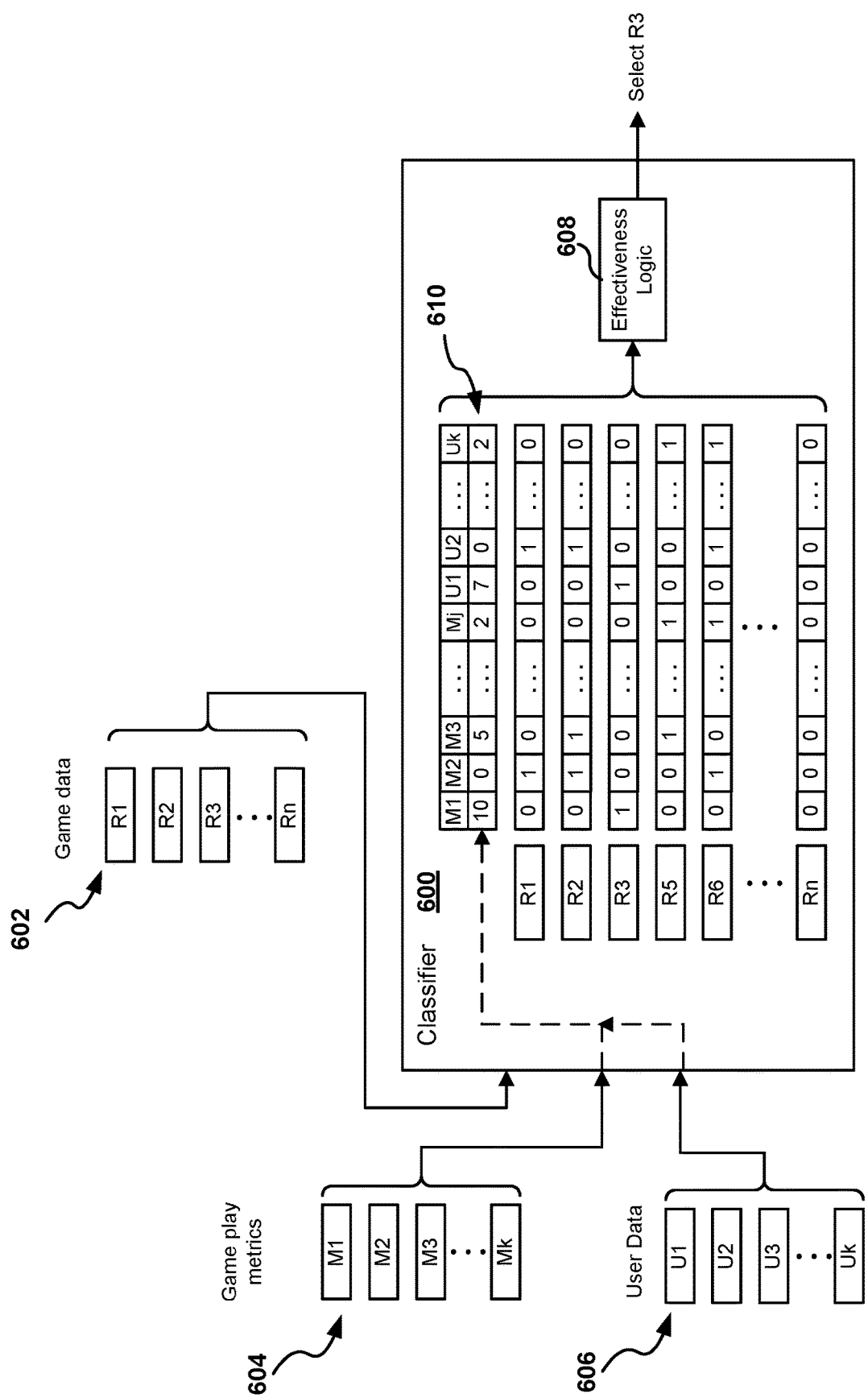
FIG. 6 shows a conceptual illustration of classifier for generating a game model, according to one embodiment.

FIG. 6 shows a simplified conceptual illustration of classifier 600 used by the machine learning module to rank various resources by effectiveness for the user, according to one embodiment. In the embodiment shown, the classifier 600 operates on discrete segments of game data 602 originating from a plurality of players. Each of the game data 602 for R1-Rn represent game state data played with resources R1-Rn, respectively. Game play metrics 604 are metrics that measure certain game play characteristics for each of the game data 602. Game play metrics 604 may include measurements of ease of use, duration of use, damage taken, number of attempts, etc. User data 606 are additional metrics that are specific to the player. For example, U1 through Uk might capture user preferences, tendencies, skill level, play style, average actions per minute (APM), etc. Each of the metrics from game play metrics 604 and user data 606 are weighted by weight vector 610. The weights shown in weight vector 610 are in arbitrary units. However, it can be discerned from the weight vector 610 that metric M1, M3, and U3 are relatively more important indicators of effectiveness and weighted to a greater extent that metrics M2, Mj, U2, and Uk. Each of the game data 602 for resources R1-Rn are processed for the game play metrics 604 of M1-Mj and user data 606 U1-Uk. As a result, each of the game data 602 is given a score for metrics M1-Mj and U1-Uk. Although the score shown in FIG. 6 are binary (e.g., metric M1 is a condition that is met or not), the scores may be non-binary as well.

Once the classifier 600 scores each of the game data 602 across the game play metrics 604 and the user data 606, the effectiveness logic 608 is able to rank each of resources R1-Rn in terms of effectiveness. The ranking is personalized to the user by factoring in the user data 606. The effectiveness logic 608 is shown to select resource R3 because the corresponding game segment having used resource R3 scored the highest given the game play metrics 604 and the user data 606. As a result, the classifier 600 is able to classify and rank various resources for their relative effectiveness to a particular player. The classifier 600 may be used by a surfacing platform to identify more effective resources for the player. The classifier 600 may also be used to construct the game model.

Figure 7:
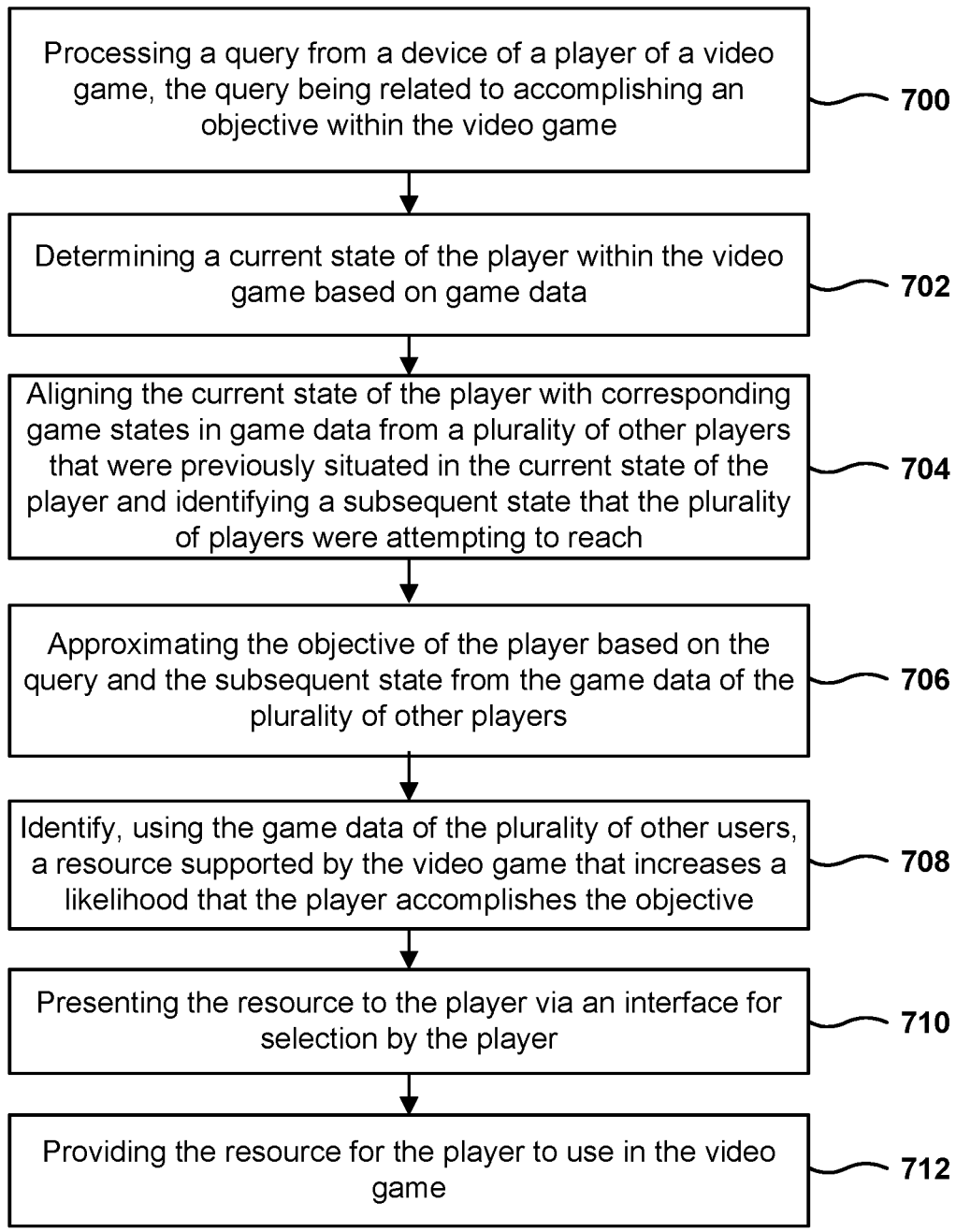
FIG. 7 shows an overall flow of a method for processing a query from a user and for responding to the query, according to one embodiment.

FIG. 7 shows an overall flow of a method for carrying out surfacing platform operations, according to one embodiment. In operation 700, the method provides for processing a query from a device of a player of a video game, where the query is related to accomplishing some objective within a video game. The query may be in the form of speech or text input. Processing the query may proceed in a manner described in relation to FIG. 2, for example. Generally, there is an intention motivating each query relating to accomplishing some objective within the video game. As used herein, the objective is to be broadly construed as any action taken within the video game. For example, the query might relate to a relatively basic objective, such as performing a basic move (e.g., "how do I jump?"), acquiring some quality (e.g., "how do change my character's skin?"), obtaining some data about the player's state (e.g., "which way is north?"), obtaining some data about the player's game play (e.g., "what is my shooting accuracy?"), etc. The query may also be related to achieving a more complex objective, such as defeating an enemy, setting a personal record, improving a certain aspect of game play, completing a task under certain conditions, etc.

In operation 702, the current state of the player within the video game is determined based on the player's game data. The current state of the player provides contextual data for interpreting and disambiguating the query, as well as contextual data for subsequent processes of identifying one or more resources in response to the query. For example, if the current state of the player is determined to be just prior to fighting Boss X and the query reads "how do I defeat the boss?" the method is therefore able to narrow "the boss" of the query to being Boss X.

The method of FIG. 7 flows to operation 704, which serves to align the current state of the player with corresponding game states in game data from a plurality of other players that were previously situated in the current state of the player. Operation 704 further identifies a subsequent state that the plurality of other players was attempting to reach. The game data from the plurality of other players may be from community data or from a game model, and generally follows a timeline. Aligning the current state of the player with corresponding game states in game data from a plurality of other players involves searching or scanning the game data of the plurality of other players for the current state of the player. In some embodiments, operation 704 may also identify successful attempts of other players of completing the objective.

In some embodiments, the game data from the plurality of other players may be indexed for various game states for faster searching. For example, the game data from the plurality of other players may include indexing for states just prior, during, and just following each boss. Thus, if the player has a current state that is just prior to engaging with Boss X, operation 704 may search the game data of the plurality of other players for those game states in which each of the plurality of other players were just prior to engaging with Boss X. Once the corresponding game states in the game data of the plurality of other players are identified or indexed to, an alignment is achieved.

Further, operation 704 serves to identify a subsequent state that the plurality of other players reached. Operation 704 would therefore identify the state corresponding to just following the defeat of Boss X as the subsequent state. Such would be an example of a successful attempt by another player. In some embodiments, there may be more than one subsequent state. For example, the video game may allow the player to alternatively complete task T to leapfrog Boss X and move on to the next challenge. Operation 704 is therefore contemplated to be to identify more than one subsequent state from the game data of the plurality of other players. Here, the subsequent states may include: defeating Boss X, completing task T, and leapfrogging Boss X having completed task T, where, for example, half of the plurality of other players had a subsequent state of defeating Boss X and the other half leapfrogging Boss X.

In operation 706, the method provides for approximating the objective of the player based on the query and the subsequent state from the game data of the plurality of other players. When approximating the objective that is behind the query, the current state of the player and the subsequent state from the game data are used to provide context. Here, the current state (e.g., just prior to engaging with Boss X) and the subsequent states (e.g., defeating Boss X or leapfrogging Boss X by accomplishing task T) contextualizes the query such that the objective can be narrowed to advancing pass Boss X, either by defeating Boss X or by completing task T to leapfrog Boss X. Operation 706 approximates the objective determining which of the set of possible objectives most closely matches the query. Since the query is for defeating Boss X, operation 706 may then approximate the objective to be defeating Boss X instead of leapfrogging Boss X by completing task T.

When the objective is approximated by operation 706, operation 708 serves to identify a resource supported by the video game that increases the likelihood that the player accomplishes the objective using the game data from the plurality of other users. For example, the game data of the plurality of other users who successfully defeated Boss X may be analyzed for the resources used and the effectiveness of those resources. If, for example, the game data of the plurality of other users indicates that those players used one of resource D, E, or F to defeat Boss X, operation 708 may also examine the effectiveness of each of resource D, E, and F. If, for example, resource E is found to have enabled their users to defeat Boss X in less time, in fewer attempts, or with less damage taken than resources D and F, operation 708 may identify resource E as the resource most likely to enable the player to accomplish the objective. A number of other metrics may be used to measure or rank the effectiveness of resources, including ease of use, cost of resource, skill level required to use the resource, etc. Once the resource is identified, it is presented to the player via an interface for selection by the player in operation 710. In operation 712, the resource is provided to the player for immediate use in the video game. In this manner, the method of FIG. 7 enables an immediate and effective solution to a player's query.

Figure 8:
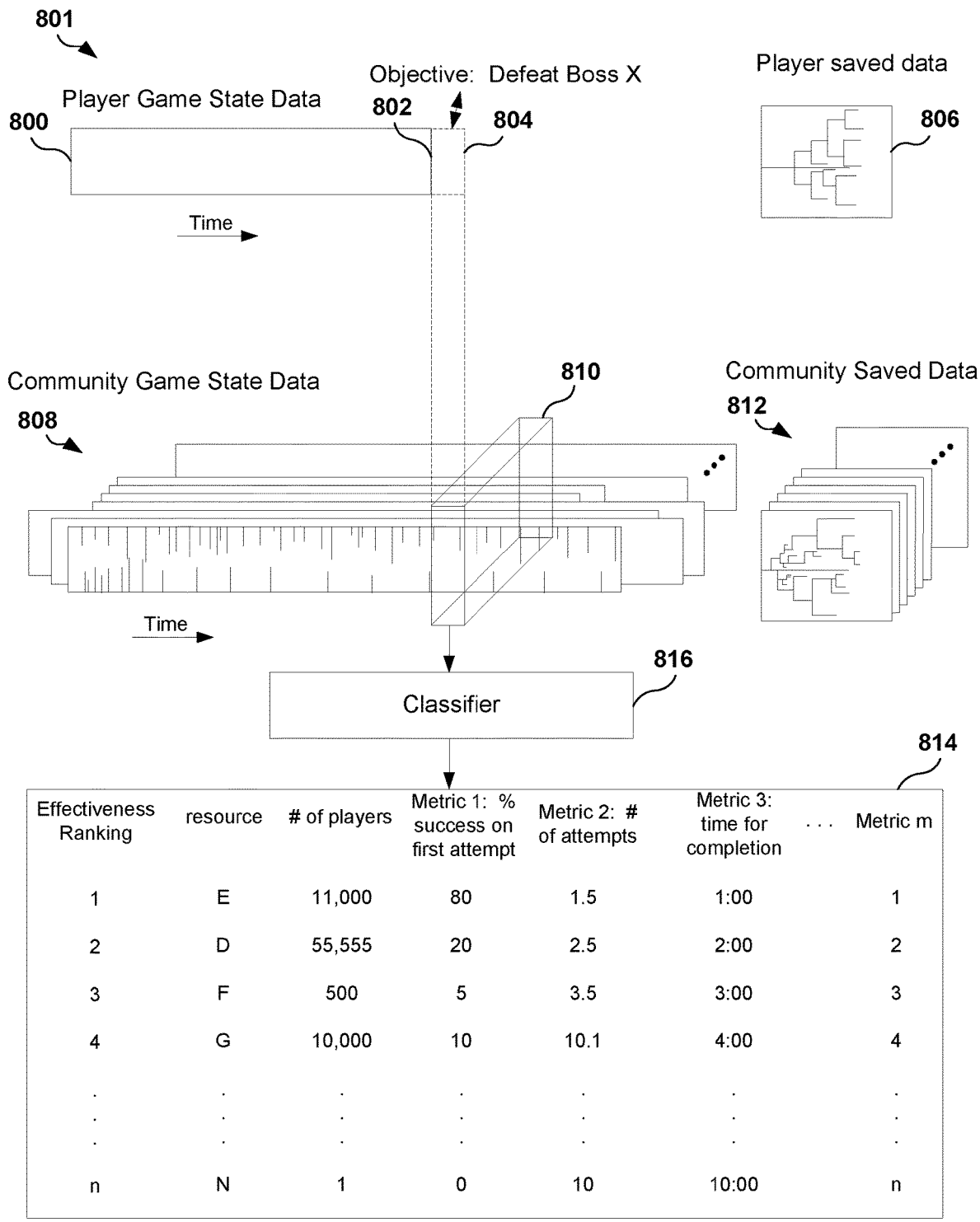
FIG. 8 shows a conceptual illustration of how a surfacing platform is able to identify and rank various resources for presentation to a user, according to another embodiment.

FIG. 8 shows a conceptual illustration of how a surfacing platform is able to identify and rank various resources for presentation to a user, according to another embodiment. The player game state data 800 is represented in a timeline format having a current state 802. The player's objective of defeating Boss X comprises transitioning from the current state 802 to subsequent state 804. The player's saved data 806 is shown to be represented as a time-independent block of data.

The surfacing platform 801 is shown to access community game state data 808 and community saved data 812, both originating from a plurality of other players. Each of the game state data timelines are shown to be aligned with reference to the current state 802 of the player game state data 800. For example, if the current state 802 is just prior to engaging with Boss X, the corresponding states of being just prior to engaging with Boss X for each respective game state data timelines within the community game state data 808 are identified. The surfacing platform 801 may also filter the community game state data 808 using the community saved data 812 to find select ones of the community game state data 808 that more closely matches the player game state data 800 and saved data 806.

According to FIG. 8, the surfacing platform 801 is shown to scan a window 810 of the community game state data 808 for segments of the individual game state data that are bookended by the current state 802 and the subsequent state 804. In this manner, the surfacing platform identifies successful attempts of completing the objective of "defeat boss X." As a result, the surfacing platform 801 is able to obtain information related to how the plurality of players advanced from current state 802 to the subsequent state 804, including the resources utilized in so doing. For example, the surfacing platform is envisioned to identify one or more resources that the other players used on those successful attempts, and, the extent to which the resources contributed to the successful attempts.

Further, a classifier 816 is shown to produce a list 814 of various resources D-N that are ranked by their effectiveness. The effectiveness of each resource are based on metrics 1-$m$, and include, for example, the rate of success on the first attempt, the number of attempts needed to accomplish the objective, the time for completion, and others. The surfacing platform 801 is thus able to select from the list 814 a resource that has been more effective than others for accomplishing the objective and should likewise be more effective for the player in doing the same. Here, resource E will be selected because it averaged a higher rate of successful first attempts, fewer overall attempts for completion of the objective, and a lesser average time to completion.

Figure 9:
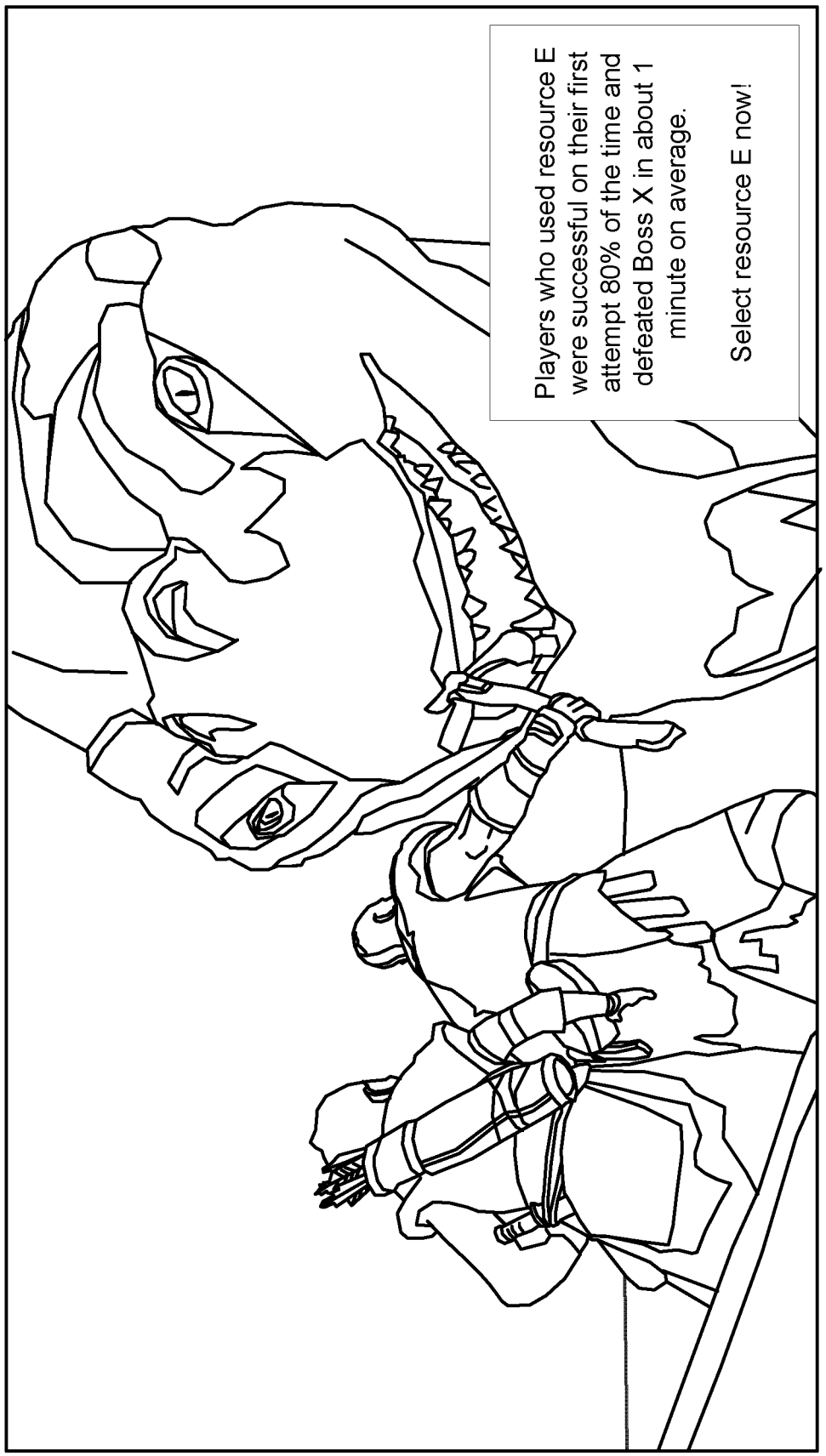
FIG. 9 shows an illustration of how a surfacing platform may present a resource to a user in response to query, according to one embodiment.

FIG. 9 shows an illustration of how a surfacing platform may present a resource to a user in response to query, according to one embodiment. FIG. 9 shows, for example, a video game being played by a player at a state just prior to engaging with an enemy, Boss X. When the player queries the surfacing platform of how to defeat Boss X, the surfacing platform may present a result in a window as shown. The window presents the resource in a way that informs the player of how a community of players performed with the presented resource. In some embodiments, the video game is paused or suspended when the window is presented. In other embodiments, the video game may continue while the window is being presented. In still other embodiments, the video game may be in a "soft-pause" state wherein the graphics of the video game remain dynamic, but major activities in the game such as those that would alter the current game state do not occur.

In some embodiments, the window may provide statistical data as to the rate of success and the average time to completion that the community of players registered when using the presented resource. The player is thus provided with communal data relating to the actual effectiveness of the resource as played by a community of peers. The player can make a more informed decision to select the resource or not and can be confident in their selection. In some embodiments, selection of various resources may require a form of payment, for example by using virtual currency or real money. In some embodiments, the selection of various resources may be in the form known as a "micro-transaction," which deal with relatively small sums of real money. In other embodiments, selection of various resources may not require payment of currency, virtual or real, but the game system may limit the number of resources the player can select. It is also contemplated that selection of any resource will result in immediate access and use of the resource to minimize the delay between when a query is submitted and when a solution made live. Although a window is shown in the embodiment of FIG. 9, other forms of communicating the information contained in the window may be used, such as by use of a secondary display, or by audio communication, or by transitioning to a full screen display of the window.

Figure 10A:
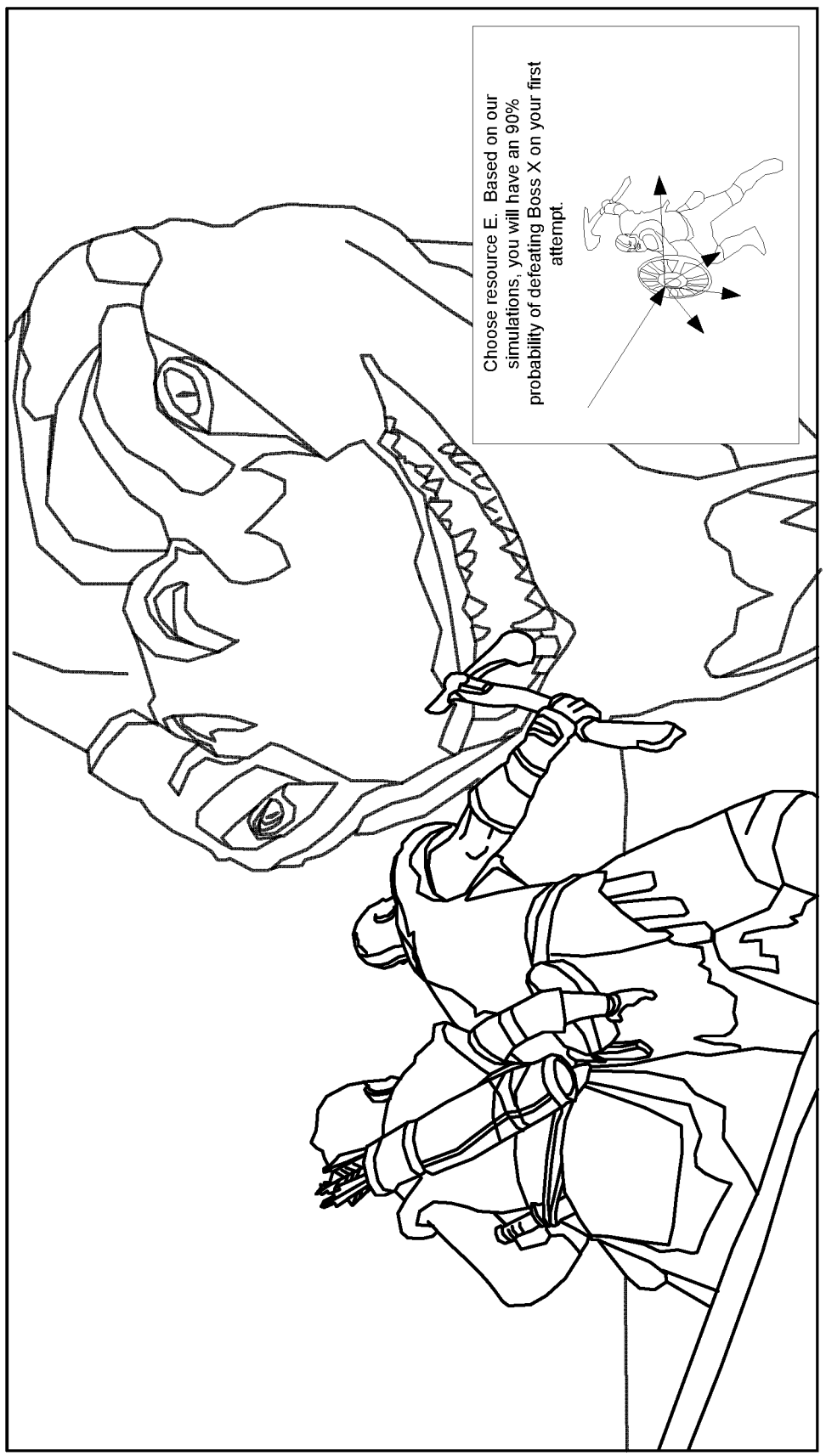
FIG. 10A shows an additional embodiment for presenting a resource to a user by a surfacing platform.

FIG. 10A shows an additional embodiment for presenting a resource to a user by a surfacing platform. Here, the player may have submitted a similar query to the surfacing platform related to defeating Boss X. In response, the surfacing platform may present a window with statistical information related to the effectiveness of a resource E. In FIG. 9, the window presented communal data representing how a cohort of players performed using resource E. In FIG. 10A, the window may show predictive data representing how the player is likely to perform with resource E. In some embodiments, the video game is paused or suspended when the window is presented. In other embodiments, the video game may continue while the window is being presented. In still other embodiments, the video game may be in a "soft-pause" state wherein the graphics of the video game remain dynamic, but major activities in the game such as those that would alter the current game state do not occur.

According to some embodiments, the predictive data may be based on simulations of the player using resource E using an AI player modeled after the player, or by factoring in differences between the player's skill level, play style, and other qualities, and that of average player having used resource E. Here, the probability of success is shown to be higher than what the communal data showed in FIG. 9 (e.g., 90% instead of 80%). This may be due to the surfacing platform accessing simulation data indicating a predictive value of success using resource E to be 90%, which happens to be higher than the average of the cohort of other players using the same resource. In other embodiments, the surfacing platform may use the communal data and adjust for a predictive value of success based on the player's attributes. If the player, for example, has more experience or is better at using resources of the type as resource E than the average player in the cohort, the surfacing platform adjust the baseline value of 80% by 10% to account for those difference. As a result, the player is given quantitative and personalized data of success with predictive capabilities associated with the use of various resources.

In addition to displaying the predictive value of success in using resource E, the window of FIG. 10A also displays a graphic or clip of resource E as it would be used in-game. For example, resource E, which is a shield, is shown in action to deflect an attack. The clip of resource E therefore informs the user of how the resource looks in actions, how it works, and how it changes the state of affairs for them within the video game. In this manner, the player is provided with qualitative and experiential data of the resource in addition quantitative data of its effectiveness, both of which enable the player to make a more informed choice.

Figure 10B:
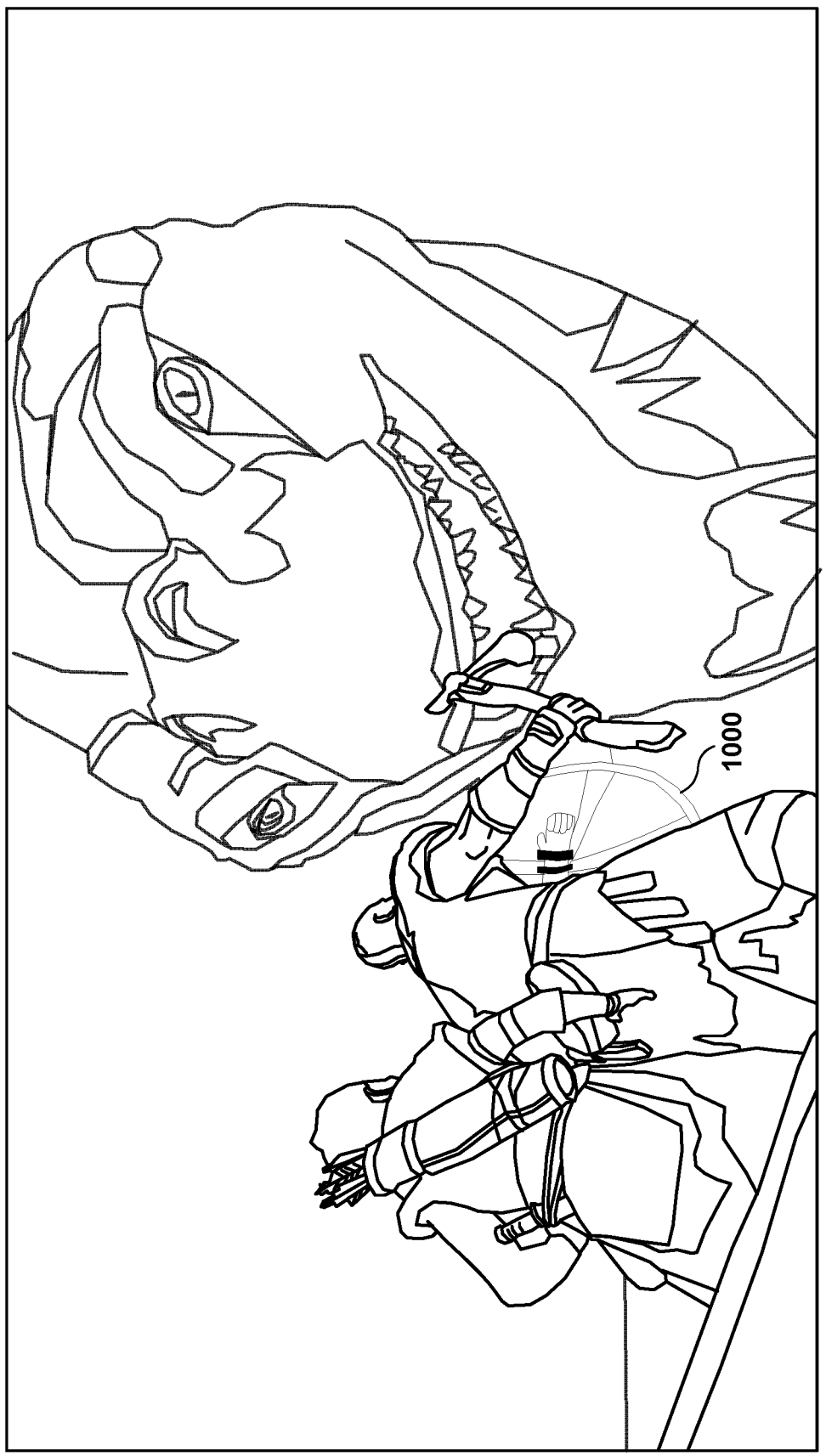
FIG. 10B shows an embodiment of how the surfacing platform enables immediate use of the resource that is presented to the user.

FIG. 10B shows an embodiment of how the surfacing platform enables immediate use of the resource that is presented to the user. In FIGS. 9 and 10, a shield was presented by the surfacing platform to the user via a window. In response, the user may indicate selection of the surfaced resource by using a controller to click on the window, by uttering a command to select the resource, or by using gaze commands to indicate selection. Once there is some indication of selection from the user, display of the window may terminate. The resource is integrated into the video game for immediate use such that the player has possession and control of the resource. In some embodiments, the resource is integrated into the video game by updating the game state data and the saved data to reflect the presence of the resource. As a result, when the video game is executed following selection of the resource, the resource is rendered into the video game. For example, in FIG. 10B, the shield 1000 is shown to be wielded by the character of the player in anticipation of an upcoming battle.

In some embodiments, there is a transaction between the player or their account and the surfacing platform or the video game that enables immediate use of the resource by the player. In some embodiments, the transaction may include a payment by the user, a background charge to the user's account, a charge of certain credits the user has, etc.

In some embodiments, the resource the rendered based on a rendering profile for the resource based on player attributes. For example, each resource may have a variety of ways in which they are rendered for the video game, depending upon the character that the player is using and depending upon attributes of the player. In one example, a larger character is given a version of the shield that is larger, whereas a miniature character is given a miniature version of the shield. In this manner, the resource is rendered to match the characteristics of the character. Moreover, each resource may have versions that differ in the way they are used and their difficulty of use. For example, when selecting a rendering profile for a resource, the player attributes, including the skill level of the player, play style of the player, and the preferences of the player are considered. When a player is more skilled, they may be provisioned with a version of the resource that is of greater complexity and difficulty to use, whereas a beginning player may be provisioned with a version of the resource that is more user-friendly.

In addition to in-game assistance, the surfacing platform is envisioned to also be useful in the context of a virtual store. A virtual store such as the PlayStation® Store may have thousands of resources available to players for similarly wide selection of game titles. It is therefore a challenge for players to have an idea of what resources are particularly useful for them. The surfacing platform is contemplated to also be implemented in the context of a virtual store such that the player is provided with recommendations of particular suitability to their needs. FIG. 11 illustrates a virtual store that implements a surfacing platform. The virtual store is shown to display four resources: chest Armor for game 1, guardian shield for game 1, portion for game 2, and launch pad for game 3. Each of these items is surfaced by the surfacing platform according to player game data for games 1-3. The surfacing platform may access the game state data for each of games 1-3 to determine a current game state for games 1-3.

In game 1, for example, the surfacing platform may determine the current state to be prior to engaging with Boss X. The surfacing platform may then access the game model for game 1 or the community data of other players playing game 1 to identify a subsequent state that the player is likely wanting advance to. Here, the subsequent state is having defeated Boss X, and the surfacing platform is able to identify the resources used to defeat Boss X. As a result, the surfacing platform displays resources chest armor and guardian shield to recommended resources for the player to select or purchase for subsequent game play of game 1. The surfacing platform does the same for game 2, game 3, and other games the player is involved in. Moreover, the surfacing platform is able to provide quantitative data as to the benefits of each resource based on community data or simulation data. The recommended resources shown in FIG. 11 may be automatically populated, or may be in response to a query from a user.

Figure 12:
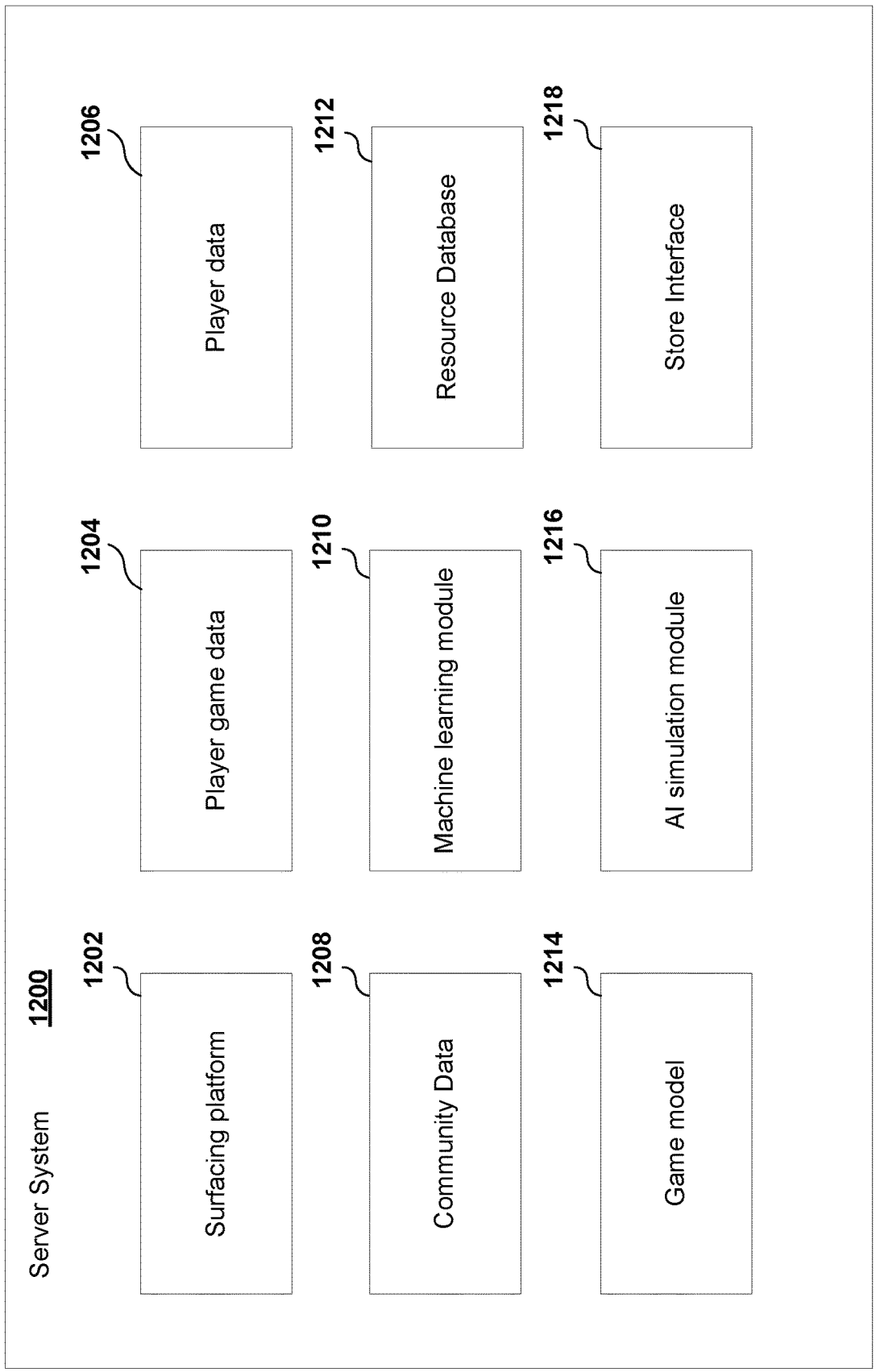
FIG. 12 shows selected components at a server for enabling a surfacing platform to operate at a virtual store level, according to one embodiment.

FIG. 12 illustrates a server system 1200 and select components for hosting a virtual store implemented with a surfacing platform, according to one embodiment. The server system is shown to include a surfacing platform 1202, which is used to find contextually relevant resources for the player given the player's current state in various games, community data from a plurality of other players, and player data such as skill level, play style, preferences, and others. Player game data 1204 encompasses the game state data and saved data for each of the game titles that the player has participated in. Player data 1206 is contemplated to describe the player's qualities as a player with respect to each game, and with respect to games in general. For example, player data 1202 may indicate that the player tends to prefer ranged weapons in each of games 1-10. The surfacing platform may thus surface resources that are of the same category of ranged weapons for games 1-10 and communicate those resources to store interface 1218. In addition, however, the since the surfacing platform has access to player data 1206 from numerous games, the surfacing platform may surface a ranged weapon for game 11, even though the player has not demonstrated a tendency to use ranged weapons in game 11. As a result, the surfacing platform 1202 is able to make recommendations to the store interface 1218 based on global data of the player as a player of games, and not just as a player of some specific game.

Also shown in FIG. 12 are the community data 1208, the machine learning module 1210, the resource database 1212, and the game model 1214. These components were described in detail in relation to in-game surfacing, but they function in a similar manner in the context of a virtual store using a surfacing platform 1202 to generate recommended resources. Further shown in FIG. 12 is an AI simulation module 1216, which may be used to test or simulate how the player would perform using various resources. The data there obtained is accessible by the surfacing platform 1202 evaluate the effectiveness of various resources in the process of making recommendations to the store interface 1218.

Figure 13:
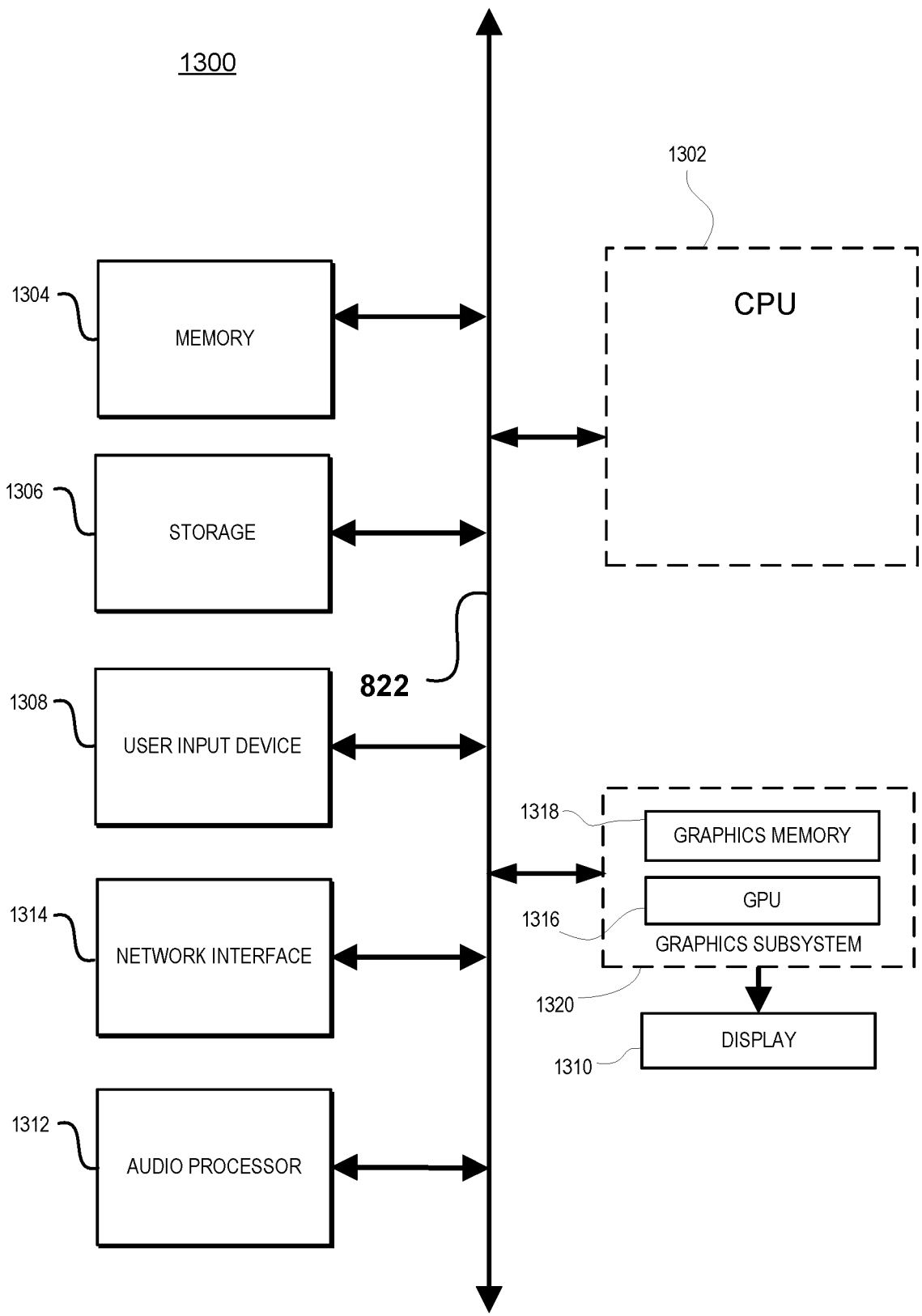
FIG. 13 illustrates components of an example device that can be used to perform aspects of the various embodiments of the present disclosure, such as playing, creating, and viewing challenge games, according to one embodiment.

FIG. 13 illustrates components of an example device 1300 that can be used to perform aspects of the various embodiments of the present disclosure. For example, FIG. 13 illustrates an exemplary hardware system suitable for implementing a device that provides services in support of a user, such as for surfacing contextually relevant in-game resources for use by a player in response to a query or for surfacing contextually in-store resources for use by a player, in accordance with one embodiment. This block diagram illustrates a device 1300 that can incorporate or can be a personal computer, video game console, personal digital assistant, a server or other digital device, suitable for practicing an embodiment of the disclosure. Device 1300 includes a central processing unit (CPU) 1302 for running software applications and optionally an operating system. CPU 1302 may be comprised of one or more homogeneous or heterogeneous processing cores. For example, CPU 1302 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 1300 may be a localized to a player playing a game segment (e.g., game console), or remote from the player (e.g., back-end server processor).

Memory 1304 stores applications and data for use by the CPU 1302. Storage 1306 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1308 communicate user inputs from one or more users to device 1300, examples of which may include keyboards, mice, joysticks, touch pads, touch screens, still or video recorders/cameras, tracking devices for recognizing gestures, and/or microphones. Network interface 1314 allows device 1300 to communicate with other computer systems via an electronic communications network, and may include wired or wireless communication over local area networks and wide area networks such as the internet. An audio processor 1312 is adapted to generate analog or digital audio output from instructions and/or data provided by the CPU 1302, memory 1304, and/or storage 1306. The components of device 1300, including CPU 1302, memory 1304, data storage 1306, user input devices 1308, network interface 1310, and audio processor 1312 are connected via one or more data buses 1322.

A graphics subsystem 1320 is further connected with data bus 1322 and the components of the device 1300. The graphics subsystem 1320 includes a graphics processing unit (GPU) 1316 and graphics memory 1318. Graphics memory 1318 includes a display memory (e.g., a frame buffer) used for storing pixel data for each pixel of an output image. Graphics memory 1318 can be integrated in the same device as GPU 1308, connected as a separate device with GPU 1316, and/or implemented within memory 1304. Pixel data can be provided to graphics memory 1318 directly from the CPU 1302. Alternatively, CPU 1302 provides the GPU 1316 with data and/or instructions defining the desired output images, from which the GPU 1316 generates the pixel data of one or more output images. The data and/or instructions defining the desired output images can be stored in memory 1304 and/or graphics memory 1318. In an embodiment, the GPU 1316 includes 3D rendering capabilities for generating pixel data for output images from instructions and data defining the geometry, lighting, shading, texturing, motion, and/or camera parameters for a scene. The GPU 1316 can further include one or more programmable execution units capable of executing shader programs.

The graphics subsystem 1314 periodically outputs pixel data for an image from graphics memory 1318 to be displayed on display device 1310. Display device 1310 can be any device capable of displaying visual information in response to a signal from the device 1300, including CRT, LCD, plasma, and OLED displays. Device 1300 can provide the display device 1310 with an analog or digital signal, for example.

While specific embodiments have been provided to demonstrate the surfacing of contextually-relevant resources to players, these are described by way of example and not by way of limitation. Those skilled in the art having read the present disclosure will realize additional embodiments falling within the spirit and scope of the present disclosure.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server or a virtual store server may be used to perform the operations of surfacing contextually relevant in-game and in-store resources to video game players, in some embodiments. Most video games played over the Internet operate via a connection to the game server. Typically, games use a dedicated server application that collects data from players and distributes it to other players. Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It will be appreciated by those skilled in the art that in various embodiments of the disclosure, the aforementioned head mounted device may be utilized in conjunction with an interactive application displayed on a display to provide various interactive functions. The exemplary embodiments described herein are provided by way of example only, and not by way of limitation.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A computer-implemented method, comprising:
    processing, by a surfacing platform stored in memory and executed by a processor of a computer, a query from a device of a player of a video game, the query being related to completing an objective by advancing to a subsequent state from a current state in the video game, wherein the processing includes interpreting the query to determine an intent of the player for completing the objective;

processing, by the surfacing platform, the game data of the player for determining the current state of the player within the video game and processing game data of other players that have completed the objective by advancing to the subsequent state from the current state;

identifying, by the surfacing platform, from the game data of other players, successful attempts of completing the objective and identifying one or more resources utilized by corresponding ones of game characters representing said other players during said successful attempts of completing the objective;

identifying, by the surfacing platform, a resource that is usable by a game character representing the player to complete the objective in the video game, the resource corresponding to the intent of the player is identified from the one or more resources utilized by said other players during said successful attempts of completing the objective, the resource identified using a machine learning module within the surfacing platform is an in-game virtual resource for use to provide input within the video game and is identified based on a measure of effectiveness associated with said resource for said successful attempts of completing the objective by said other players, the resource having multiple versions and identifying the resource includes identifying a version of the resource that matches with player attributes of the player and characteristics of the game character of the player in the video game; and presenting, by the surfacing platform, the resource to the player via a user interface rendered on the device for selection of the resource by the player, wherein based on said selection of the resource by the player, the version of the resource is integrated into a virtual game environment of the video game and is associated with the game character of the player within the video game, the integration providing the game character representing the player with access for immediate use of said version of the resource to provide the input during game play so as to assist the player in completing the objective of advancing to the subsequent state in the video game in accordance to the intent, wherein integrating includes updating the game data associated with play of the video game of the player to include said version of the resource in the virtual game environment of the video game, the input provided using the resource by said game character representing the player, and game state resulting from applying the input, and wherein the surfacing platform includes components configured to communicate with game system to retrieve and process the game data of the player, and to integrate the resource into the virtual game environment of the video game for immediate use by the game character of the player, and wherein the game character is a virtual character manipulated using input from the player.

2. The computer-implemented method of claim 1, wherein said measure of effectiveness is calculated for each of the one or more resources utilized by the other players during said successful attempts of completing the objective, the measure of effectiveness is based on a plurality of game play metrics of the other players during said successful attempts of completing the objective; and wherein the resource selected from the one or more resources has a highest measure of effectiveness.

3. The computer-implemented method of claim 1, wherein said selecting the resource includes:

accessing a game model for the video game that tracks game play by the other players during said successful attempts of completing the objective, the game model provides measures of effectiveness for the one or more resources utilized by the other players;

processing the game data of the player to determine a player profile of the player, the player profile includes indicators of a play style and skill level of the player; and identifying the resource from the one or more resources utilized by the other players during said successful attempts of completing as the resource selected based on the measures of effectiveness and based on the player profile of the player.

4. The computer-implemented method of claim 1, wherein the query includes a phrase that is uttered by the player relating to performing some action within the video game, said processing the query includes using natural language processing and analysis of the current state of the player for extracting the objective that the query is related to.

5. The computer-implemented method of claim 1, wherein the current state of the player includes inventory data that describes resources the player possesses at the current state, and wherein said selecting the resource is further based on the inventory data such that the resource that is selected is not one that the player possesses at the current state.

6. The computer-implemented method of claim 1, wherein said identifying successful attempts of completing the objective by the other players includes:

determining, from the game data of the other players, that the other players have been situated at the current state or a similar state; and determining, from the game data of the other players, that the other players have reached the subsequent state while obtaining a score associated with reaching the subsequent state.

7. The computer-implemented method of claim 2, wherein the game play metrics for calculating the measure of effectiveness for each of the one or more resources utilized by the other players during said successful attempts of completing the objective include a duration of time used to achieve the objective, a number of attempted use to achieve the objective, an extent of damage taken to achieve the objective, an amount of energy expended to achieve the objective, or a number of action taken to achieve the objective.

8. The computer-implemented method of claim 1, wherein said presenting the resource to the player via the device for immediate use enables a frictionless transaction between the player and the video game such that the player is given immediate access to the resource without needing to suspend or exit the video game.

9. The computer-implemented method of claim 1, wherein said presenting the resource to the player via the device for immediate use by the player includes:

Selecting a rendering profile for the resource based on the player attributes, the rendering profile defines how the version of the resource is to be rendered in the video game and the player profile defines one or more of a character of the player, a skill level of the player, a play style of the player, or a preference of the player; and rendering the resource for use by the player in the video game according to the rendering profile such that the resource is rendered to match the player profile of the player.

10. The computer-implemented method of claim 1, wherein the surfacing platform is integrated into the game system of the video game.

11. The computer-implemented method of claim 1, wherein the surfacing platform is part of a server system that includes the computer used to execute the surfacing platform.

12. The computer-implemented method of claim 1, wherein the surfacing platform is implemented within a virtual store accessible to game systems of a plurality of video games executing on a server system.

13. The computer-implemented method of claim 1, wherein the measure of effectiveness is determined by ranking each of the one or more resources utilized by other players in completing the objective.

14. The computer-implemented method of claim 13, wherein the ranking is customized for the player based on a plurality of game play metrics of the player.

15. The computer-implemented method of claim 1, wherein interpreting the query of the player includes interpreting language used in the query, contextual data obtained from player data of the player and of other players, context of the game obtained from the game data of the video game.

16. A non-transitory computer-readable storage medium storing a computer program, which when executed by a processor based system, causes the processor based system to:
   process a query from a device of a player of a video game, the query being related to completing an objective by advancing to a subsequent state from a current state in the video game, wherein the processing includes interpreting the query to determine an intent of the player for completing the objective;
   process the game data of the player for determining the current state of the player within the video game and process game data of other players that have completed the objective by advancing to the subsequent state from the current state;
   identify, from the game data of other players, successful attempts of completing the objective and identify one or more resources utilized by said other players during said successful attempts of completing the objective;
   identify a resource that is usable by a game character representing the player to complete the objective in the video game, the resource corresponding to the intent of the player is identified from one or more resources utilized by said other players during said successful attempts of completing the objective, the resource identified using a machine learning module within the surfacing platform is an in-game virtual resource for use to provide input within the video game and is identified based on a measure of effectiveness associated with said resource for said successful attempts of completing the objective by said other players, the resource having multiple versions and identifying the resource includes identifying a version from the multiple versions of the resource that matches with player attributes of the player and characteristics of the game character representing the player in the video game; and
   present the resource to the player via a user interface rendered on the device for selection of the resource by the player,
   wherein based on detecting said selection of the resource by the player, integrate the version of the resource into a virtual game environment of the video game and associate the resource with the game character of the player within the video game, the integration providing the game character representing the player with access for immediate use of said version of the resource to provide the input during game play so as to assist the player in completing the objective of advancing to the subsequent state in the video game in accordance to the intent of the player,
   wherein said integration includes updating the game data associated with play of the video game by the player to include said version of the resource in the virtual game environment of the video game, the input provided by said game character using the resource, and game state resulting from applying the input provided using the resource by said player, and
   wherein the game character is a virtual character within the virtual game environment and is manipulated using input from the player.

17. The non-transitory computer-readable storage medium of claim 16, wherein said measure of effectiveness is calculated for each the one or more resources utilized by the other players during said successful attempts of completing the objective, the measure of effectiveness is based on a plurality of game play metrics of the other players during said successful attempts of completing the objective; and
   wherein the resource selected from the one or more resources has a highest measure of effectiveness.

18. The non-transitory computer-readable medium of claim 16, wherein the game play metrics for calculating the measure of effectiveness for each of the one or more resources utilized by the other players during said successful attempts of completing the objective include a duration of time use to achieve the objective, a number of attempted use to achieve the objective, an extent of damage taken to achieve the objective, an amount of energy expended to achieve the objective, or a number of action taken to achieve the objective.

* * * * *